United States Patent [19]
Reeves et al.

[11] 3,844,824
[45] Oct. 29, 1974

[54] PROCESS OF TREATING FIBROUS MATERIALS WITH THE REACTION PRODUCT OF METHYLOLPHOSPHINE ADDUCTS AND NITROGENOUS COMPOUNDS

[75] Inventors: Wilson A. Reeves; Darrell J. Donaldson, both of Metairie; Donald J. Daigle, New Orleans; George L. Drake, Jr., Metairie; John V. Beninate, Gretna, all of La.

[73] Assignee: The United States of America as represented by the Secretary of Agriculture, Washington, D.C.

[22] Filed: Nov. 15, 1972

[21] Appl. No.: 306,774

Related U.S. Application Data

[62] Division of Ser. No. 141,362, May 7, 1971, abandoned.

[52] U.S. Cl........ 117/136, 117/138.8 UA, 117/141, 117/143 A, 117/143 R
[51] Int. Cl.............................................. C09d 5/18
[58] Field of Search.... 117/136, 141, 143 A, 143 R, 117/138.8 F, 138.8 N, 138.8 UA; 260/606.5 P

[56] References Cited
UNITED STATES PATENTS
3,619,113 11/1971 Stockel et al.................. 117/136 X
3,698,854 10/1972 Donaldson et al.............. 117/137 X Primary Examiner—William D. Martin
Assistant Examiner—Theodore G. Davis
Attorney, Agent, or Firm—M. Howard Silverstein; Max D. Hensley

[57] ABSTRACT

Soluble methylol phosphine adducts which contain one or more methylol phosphine radicals ($PCH_2OH$) are prepared by reacting in a suitable solvent tris(hydroxymethyl)phosphine with an amide or amine which contains one or more hydrogens attached to trivalent nitrogen. These soluble adducts are particularly valuable for the preparation of thermosetting flame resistant polymers by reacting them with nitrogenous compounds which contain two or more hydrogen and methylol groups attached to trivalent nitrogen. The adducts are also valuable for the preparation of flame-, glow-, wrinkle-, and shrink-resistant knit and woven textiles by causing the adducts to react with nitrogenous compounds in or on the textile structure by application of heat.

10 Claims, No Drawings

PROCESS OF TREATING FIBROUS MATERIALS WITH THE REACTION PRODUCT OF METHYLOL-PHOSPHINE ADDUCTS AND NITROGENOUS COMPOUNDS

This is a division, of application Ser. No. 141,362, filed May 7, 1971 now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to new phosphorus and nitrogen containing soluble compounds, to thermosetting polymers which contain phosphorus and nitrogen, and to procedures employing the use of these compounds and polymers for the production of flame-resistant fibrous organic materials. More specifically, this invention provides a process for preparing soluble nitrogen-containing methylolphosphine adducts and methods for their utilization in the production of thermosetting flame-resistant polymers and for the production of flame-resistant organic textiles.

As employed throughout the specifications and claims of this invention, the term THP refers to the compound tris-(hydroxymethyl)phosphine, $(HOCH_2)_3P$. The term methylolphosphine adduct refers to soluble compounds produced by reacting THP with certain nitrogenous compounds.

Co-pending application Ser. No. 265,861 by Daigle, Drake, Pepperman, and Reeves filed June 23, 1972, and now abandoned relates to the production of polymers through the reaction of tris(hydroxymethyl)phosphine with nitrogenous compounds containing at least two members of the group hydrogen atoms and methylol radicals ($-CH_2OH$) attached to trivalent nitrogen atoms either in the presence of free formaldehyde or not.

A primary object of the present invention is to provide methylolphosphine adducts which are stable toward further reaction during storage but which are capable of further reaction with certain nitrogenous agents to produce thermosetting flame resistant polymers and flame resistant organic textiles.

We have now discovered that tris(hydroxymethyl)-phosphine reacts with monomeric nitrogenous compounds which contain at least one member of the group hydrogen atoms and methylol radicals ($-CH_2OH$) attached to trivalent nitrogen atoms, either in the presence of free formaldehyde or not, to produce soluble methylolphosphine adducts. We have also discovered that these adducts can be further reacted with nitrogenous compounds which contain at least two members of the group hydrogen atoms and methylol radicals attached to the trivalent nitrogen to produce nitrogen and phosphorus containing polymers or flame- and wrinkle-resistant textile products.

More specifically, the products and processes of our invention may be described as follows: (1) Soluble methylolphosphine adducts are prepared by reacting THP either in the presence of free formaldehyde or not with an essentially monomeric amide or amine in a suitable solvent. In order to make the soluble and useful adducts of this invention there must be an excess of methylol phosphorus radicals ($-PCH_2OH$) in the adduct. For purposes of the reaction THP is trifunctional; the functionality of the amine or amide is determined by the number of hydrogen or methylol radicals attached to trivalent nitrogen in the compound to be reacted with THP. Thus, the adduct contains unreacted methylol phosphorus radicals. The adducts are essentially materials which contain the structures of the group consisting of:

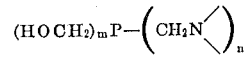

where $m$ and $n$ are integers of 1 or 2 and the sum of $m + n$ is 3. (2) To produce thermosetting polymers in accordance with this invention, the methylolphosphine adduct is reacted with a nitrogenous compound containing at least two members of the group consisting of hydrogen atoms and methylol radicals attached to trivalent nitrogen atoms. The reaction is carried out by dissolving the methylolphosphine adduct and the nitrogenous compound in a suitable medium and then heating as needed until a viscous solution and finally a solid polymer is produced. The polymers produced by this process are insoluble, thermosetting, and flame resistant. The polymers contain reoccurring trimethylene phosphorus radicals

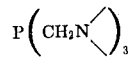

which can be oxidized to a trimethylene phosphine oxide structure

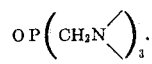

(3) To produce flame resistant organic textiles the textile structure is wetted with a solution containing the methylolphosphine adduct and nitrogenous compound containing at least two members of the group consisting of hydrogen atoms and methylol radicals attached to trivalent nitrogen atoms, then drying and heating the textile at an elevated temperature ranging from about 90° to 170°C. for a period of time necessary to promote copolymerization of the methylolphosphine adduct and the nitrogenous agent, within or on the textile structure.

Nitrogenous compounds suitable for use in preparing the methylolphosphine adducts are virtually any essentially monomeric nitrogenous compound which contains at least one member of the group hydrogen radicals and methylol radicals attached to trivalent nitrogen. Suitable nitrogenous amides include cyanamide, formamide, urea, thiourea, melamine, acrylamide, octadecylamide, glycine and the methylol derivatives of these amides. Sulfonamides and phosphoramides are also suitable. Suitable amines include methylamine, dimethylamine, ethylamine, diethylamine, phenylamine, diphenylamine, phenylmethylamine, methylcetylamine, and aniline.

Methylolphosphine adducts of this invention are prepared by agitating a solution of THP and a nitrogenous compound until reaction occurs between at least one methylol phosphorus radical and one nitrogen atom on each nitrogenous molecule to produce the structure

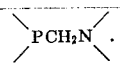

The preferred solvent is water, however, alcohols such as methanol, ethanol, isopropanol, and dimethyl formamide, dimethyl sulfoxide, and the like are very effective media. The amount of solvent can be varied as desired. The adducts are used in solution, therefore, it is not necessary to isolate them as solids. Catalysts, other than heat, are generally not needed to promote the reaction of THP with nitrogenous compounds to form soluble adducts. However, catalyst can be used when desired. Suitable catalysts include protonic acids. It is desirable to maintain the pH of the reacting system within certain limits. The preferred pH range is from 3 to 7. At pH's substantially below 3, the reaction rate is greatly reduced. At pH's substantially greater than 7, THP is oxidized to tris(hydroxymethyl)phosphine oxide, which is not very reactive.

The soluble methylolphosphine adducts of this invention have some particular advantages over the use of THP in the preparation of polymers and flame resistant organic fibrous materials. The adduct resists oxidation to the phosphine oxide when heated.

Suitable nitrogenous compounds for use with the methylolphosphine adducts in the production of thermosetting polymers include virtually any soluble nitrogenous compound containing at least two members of the group consisting of hydrogen atoms and methylol radicals attached to trivalent nitrogen atoms. Examples of suitable amides include urea, thiourea, melamine, cyanamide, ethyleneurea, propyleneurea, dicyanamide, hydroxyethylcarbamate, octadecamide, acrylamide, amino acids, methylol and alkylated methylol derivatives of these amides. Examples of suitable amines include ethylamine, methylamine, ethylene diamine, aniline and cetylamine. Mixtures of these amides and amines can suitably be used.

Thermosetting polymers of methylolphosphine adducts with nitrogen compounds are principally prepared by agitating a mixture of the adduct and the nitrogen compounds in a solvent system while heating until copolymerization occurs. The preferred relative amounts of methylolphosphine adduct and nitrogen compounds used to copolymerize can be calculated by conventional methods for condensation polymerization reactions assuming that functionality of the adduct equals the number of methylol phosphorus radicals on the adduct and the functionality of the nitrogenous agent is equal to the sum of the number of hydrogen and methylol groups attached to trivalent nitrogen. Useful products may contain only about one mole of the adduct per ten moles of nitrogenous compound and as much as about three moles of the adduct per mole of nitrogenous compound. The use of small quantities of the adduct with large quantities of nitrogenous compound is made practical when the nitrogenous compound contains N-methylol radicals which permit the compounds to form condensation polymers even in the absence of the adduct. Polymers produced in accordance with this invention contain reoccurring groups

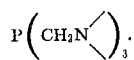

This group can be oxidized with oxidants such as peroxides, perborates, peracids and the like to the structure

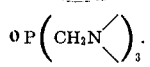

The combustibility of organic fibrous materials can be reduced in accordance with this invention by impregnating the fibrous materials with a solution of the adduct and a suitable nitrogenous compound and curing the impregnated material at a suitable temperature until copolymerization occurs between the adduct and the nitrogenous agent. The process of this invention can be used to reduce the combustibility of substantially any fibrous organic materials such as cotton, rayon, ramie, jute, wool, paper, cardboard, and mixtures of these with noncellulosic fibers which can be impregnated with a liquid and dried and cured. Where textile structures are being treated in accordance with this invention, the structure may be composed of a mixture of various fibers. The polymers produced in or on fibrous textile structures are more effective in reducing the combustibility of these products which consist only of cellulosic fibers. When noncellulosic fibers are present, best results are obtained when the structure contains 50 percent or more cellulosic fibers except when the noncellulosic fiber is itself flame resistant. Examples of flame resistant organic fibers which can be blended with cellulosic fibers and treated in accordance with this invention are those made of polyvinylchloride, polyacrylonitrile, and polyvinylidine chloride. These flame resistant fibers may be blended with the cellulosic fibers in substantially any proportion and are successfully treated for reduced combustibility by the process of this invention.

Where a textile is being impregnated, it is of advantage to remove excess impregnating liquor by passing the textile through squeeze rolls prior to drying or curing the impregnated textile. It is also advantageous to dry and heat the textile from about 90° to 170° C. for a period of time necessary to promote copolymerization of the adduct and the nitrogenous agent. The preferred heating temperature is from about 130°–160° for one to 10 minutes.

The degree of flame resistance imparted to a textile by the products of this invention can be varied from a low degree to a very high degree by varying the amount of polymer put in the textile. Textiles treated in accordance with this invention are not only flame resistant, they are also glow resistant, shrink resistant, mildew and rot resistant, and exhibit increased dimensional stability. The properties imparted to textiles by this process are durable to repeated laundering and drycleaning.

Surface active agents, water repellents, soil release agents, and other textile treating agents may be incorporated into the solution treating media to modify the treated textiles.

The following example is illustrative of the invention:

EXAMPLE 1

Soluble methylolphosphine adducts were prepared by reacting THP (melting point about 58° C.) with amides or amines as described in Table I. The adducts were added to solutions of amines or amides to produce copolymer solutions as described in Table II. The copolymer solutions were used to (a) make thermosetting polymers and (b) produce flame resistant organic fibrous materials. Aliquots of the copolymer solutions were heated from about 120°–150° C. to produce flame resistant thermosetting polymers. These are described in Table III. To produce flame resistant fibrous materials the structures were impregnated with copolymer solutions then heated to produce insoluble polymers in or on the fibrous structure as described in Table IV.

Table I

SOLUBLE METHYLOLPHOSPHINE ADDUCTS

| Adduct No. | Reactants | Reaction Conditions |
|---|---|---|
| 1 | 62 g. THP (0.5 mole)<br>42 g. Cyanamide (50% soln.)(0.5 mole)<br>90 g. $H_2O$ (5 moles) | Mixed together at room temperature. After 1 hour extreme exothermic reaction. Yellow solution. Let stand at room temperature for 3 hours more. Cooled in ice box and let stand at room temperature. (42.8% solids) |
| 2 | 62 g. THP (0.5 mole)<br>21 g. Cyanamide (50% soln.)(0.25 mole)<br>90 g. $H_2O$ (5 moles) | Mixed together at room temperature. Heated on steam cone for 10 minutes. Extreme exothermic reaction. Yellow solution. Cooled in ice box then let stand at room temperature. (41.1% solids) |
| 3 | 62 g. THP (0.5 mole)<br>30 g. Urea (0.5 mole)<br>90 g. $H_2O$ (5 moles) | Mixed together at room temperature and let stand for 4 hours at room temperature. (50.5% solids) |
| 4 | 62 g. THP (0.5 mole)<br>15 g. Urea (0.25 mole)<br>9 g. Formalin (0.125 mole)<br>90 g. $H_2O$ (5 moles) | Mixed together and heated at 80°C for 20 minutes. Cooled in ice box then let at room temperature. (45.5% solids) |
| 5 | 62 g. THP (0.5 mole)<br>110 g. $H_2O$ (6.1 moles)<br>81 g. Dimethylamine.HCl (1 mole) | Mixed together and left to stand at room temperature for 30 minutes. Cooled in ice box then let stand at room temperature. (42.5% solids) |
| 6 | 62 g. THP (0.5 mole)<br>90 g. $H_2O$ (5 moles)<br>20.25 g. Dimethylamine.HCl (0.25 mole) | Mixed together and left to stand at room temperature for 4 hours. (42.3% solids) |
| 7 | 62 g. THP (0.5 mole)<br>350 g. Isopropyl alcohol<br>53 g. N-methylaniline (0.5 mole) | Mixed together and exothermic reaction produced a small amount of solid. Removed precipitate and stored solution at room temperature until used. (24% solids) |

TABLE II

COPOLYMER SOLUTIONS USING SOLUBLE METHYLOLPHOSPHINE ADDUCTS OF TABLE I AND AN AMINE OR AMIDE

| Designation of Copolymer Solution | Composition of Copolymer Solution |
|---|---|
| A | 97 g. of adduct No. 1 mixed with 15 g. of urea and 29.2 g. $H_2O$ (40% soln.)<br>Contains: 0.25 mole THP, 0.25 mole cyanamide, 0.25 mole urea. |
| B | 95 g. of adduct No. 2 mixed with 32.4 g. trimethylol melamine and 83 g. $H_2O$ (40% soln.)<br>Contains: 0.25 mole THP, 0.125 mole cyanamide, 0.125 mole $CH_2O$, and 0.15 mole TMM. |
| C | 91 g. of adduct No. 3 mixed with 87.0 g. N,N'-dimethylol ethyleneurea (50% soln.), and 44 g. $H_2O$ (40% soln.)<br>Contains: 0.25 mole THP, 0.25 mole urea, and 0.25 mole DMEU. |
| D | 88 g. of adduct No. 4 mixed with 21.0 g. cyanamide (50% soln.), and 17.3 g. $H_2O$ (40% soln.)<br>Contains: 0.25 mole THP, 0.125 mole urea, 0.062 mole $CH_2O$, and 0.25 mole cyanamide. |
| E | 126 g. of adduct No. 5 mixed with 19 g. of thiourea, 40 g. of Formalin, and 23.8 g. $H_2O$ (40% soln.)<br>Contains: 0.25 mole THP, 0.25 mole thiourea, 0.5 mole $CH_2O$. |
| F | 86 g. of adduct No. 6 mixed with 16 g. TMM, and 21.2 g. $H_2O$ (40% soln.)<br>Contains: 0.25 mole THP, 0.125 mole dimethylamine, 0.05 mole TMM. |
| G | 232 g. of adduct No. 7 mixed with 11 g. of trimethylol melamine.<br>Contains: 0.25 mole THP, 0.25 mole methylaniline, 0.05 mole TMM. |

TABLE III

PRODUCTION OF FLAME RESISTANT THERMOSETTING POLYMERS THROUGH USE OF METHYLOLPHOSPHINE ADDUCTS AND AMINES AND AMIDES

| Copolymer Solution Used (Designation from Table II) | Description of Thermosetting Polymer Resulting from Heating the Copolymer Solution from about 120–150°C for About 1–10 Minutes |
|---|---|
| A | Clear, hard, yellow colored polymer insoluble in $H_2O$ and ethanol. Flame and glow resistant. Contains nitrogen and phosphorus. |
| B | Clear, white, hard polymer insoluble in $H_2O$ and $C_2H_5OH$. Flame and glow resistant. Contains nitrogen and phosphorus. |
| C | Clear, white, hard polymer insoluble in $H_2O$ and $C_2H_5OH$. Flame and glow resistant. Contains nitrogen and phosphorus. |
| D | Clear, hard, slightly yellow polymer insoluble in $H_2O$ and $C_2H_5OH$. Flame and glow resistant. Contains nitrogen and phosphorus. |
| E | Hard, tan colored, opaque polymer insoluble in $H_2O$ and $C_2H_5OH$. Flame and glow resistant. Contains nitrogen and phosphorus. |
| F | Clear, hard, brittle polymer insoluble in $H_2O$ and $C_2H_5OH$. Flame and glow resistant. Contains nitrogen and phosphorus. |
| G | Clear, hard, yellow polymer insoluble in $H_2O$ and $C_2H_5OH$. Flame and glow resistant. Contains nitrogen and phosphorus. |

TABLE IV

PRODUCTION OF FLAME RESISTANT FIBROUS MATERIALS THROUGH USE OF METHYLOLPHOSPHINE ADDUCTS AND AMINES AND AMIDES

| Copolymer Solution Used (Designation from Table II) | Structure Treated | Cure Conditions Min. | Cure Conditions °C | Approx. Add-on after Washing % | Hand | Strength | Color | Flame Resistance Match Test L ° |
|---|---|---|---|---|---|---|---|---|
| A | Cotton twill fabric | 3 | 160 | 3 | Good | Good | White | 20 |
| A | Cotton knit fabric | 2 | 150 | 2 | do. | do. | do. | 60 |
| A | Cardboard | 3 | 110 | 14 | — | do. | Tan | 180 |
| A | PE/cotton blend fabric | 3 | 160 | 3 | Good | do. | White | 10 |
| B | Cotton twill fabric | 3 | 150 | 16 | Crisp | do. | do. | 120 |
| B | Nonwoven cellulosic | 6 | 140 | — | Good | do. | do. | 90 |
| C | PE/cotton blend fabric | 2 | 160 | 20 | Crisp | do. | do. | 75 |
| D | Cotton twill fabric | 3 | 160 | 3 | Good | do. | do. | 45 |
| E | Cotton double knit fabric | 4 | 150 | 16 | do. | do. | Slightly yellow | 120 |
| F | Cotton twill fabric | 3 | 150 | 19 | Crisp | do. | White | 135 |
| G | Nonwoven | 20 | 110 | — | Good | do. | do. | 75 |

We claim:

1. A process for producing flame resistant organic fibrous materials, said process comprising:
   a. reacting tris(hydroxymethyl) phosphine with a monomeric nitrogenous compound containing a trivalent nitrogen atom substituted with at least one hydrogen or methylol radical, so as to obtain a soluble methylolphosphine adduct containing unreacted methylol phosphorus radicals;
   b. forming a solution of said soluble adduct and at least one nitrogenous compound containing a trivalent nitrogen atom substituted with at least two hydrogen or methylol radicals;
   c. impregnating an organic fibrous material with said solution; and
   d. heating the impregnated material at from about 90° C. to about 170° C. until copolymerization and insolubilization of the adduct and nitrogenous compound occurs.

2. The process of claim 1 wherein the step (a) nitrogenous compound is an amide selected from the group consisting of formamide, thiourea, acrylamide, octadecylamide, glycine, sulfonamides and phosphoramides.

3. The process of claim 1 wherein the step (a) nitrogenous compound is an amine selected from the group consisting of methylamine, dimethylamine, ethylamine, diethylamine, phenylamine, diphenylamine, phenylmethylamine, methylcetylamine, dimethylamine-HCl and N-methylaniline.

4. The process of claim 1 wherein the step (b) nitrogenous compound is an amide selected from the group consisting of thiourea, ethyleneurea, propyleneurea, dicyanamide, hydroxyethylcarbamate, octadecamide and acrylamide.

5. The process of claim 1 wherein the nitrogenous compound of step (b) is an amine selected from the group consisting of ethylamine, methylamine, ethylene diamine, aniline and cetylamine.

6. The process of claim 1 wherein the step (a) nitrogenous compound is selected from the group consisting of methylamine, dimethylamine, ethylamine, diethylamine, phenylamine, diphenylamine, phenylmethylamine, methylcetylamine, dimethylamine-HCl and N-methylaniline, and the step (b) nitrogenous compound is selected from the group consisting of ethylamine, methylamine, ethylene diamine, aniline, amino acids and cetylamine.

7. The process of claim 1 wherein the impregnated material, after copolymerization and insolubilization has occurred, is exposed to an oxidant.

8. The process of claim 7 wherein the oxidant is selected from the group consisting of a peroxide, perborate or peracid.

9. The flame and glow resistant textile produced by the process of claim 1.

10. The process of claim 1 wherein the textile structure contains about 50 percent or more cellulosic fiber.

* * * * *